United States Patent [19]

Fulford

[11] 4,369,009
[45] Jan. 18, 1983

[54] LOAD CARRYING SYSTEM

[76] Inventor: John Fulford, 10 Sunset Point Dr., Mittagong, N.S.W., 2575, Australia

[21] Appl. No.: 157,094

[22] Filed: Jun. 6, 1980

[51] Int. Cl.³ .............................................. B60P 7/06
[52] U.S. Cl. .................................... 410/35; 224/324; 410/12; 410/100; 410/103
[58] Field of Search ................... 410/35, 100, 103, 12, 410/34–41, 120; 224/309, 324, 326, 329

[56] References Cited

U.S. PATENT DOCUMENTS

| 3,520,555 | 7/1970 | Blair | 410/100 |
| 3,961,709 | 6/1976 | Rowley | 410/35 |
| 4,010,848 | 3/1977 | Pater et al. | 410/35 |
| 4,243,350 | 1/1981 | Hall | 410/100 |

FOREIGN PATENT DOCUMENTS 85152 9/1975 Australia.
251422 5/1926 United Kingdom.

Primary Examiner—Richard A. Bertsch
Attorney, Agent, or Firm—Stevens, Davis, Miller & Mosher

[57] ABSTRACT

A vehicle roof rack having two separate members which are securable on the roof. Each support member has a reel with belt secured thereto. A plurality of belt engaging pegs extend horizontally from a side of each support member for the belt to pass under a peg and over the load to secure the load thereto.

8 Claims, 4 Drawing Figures

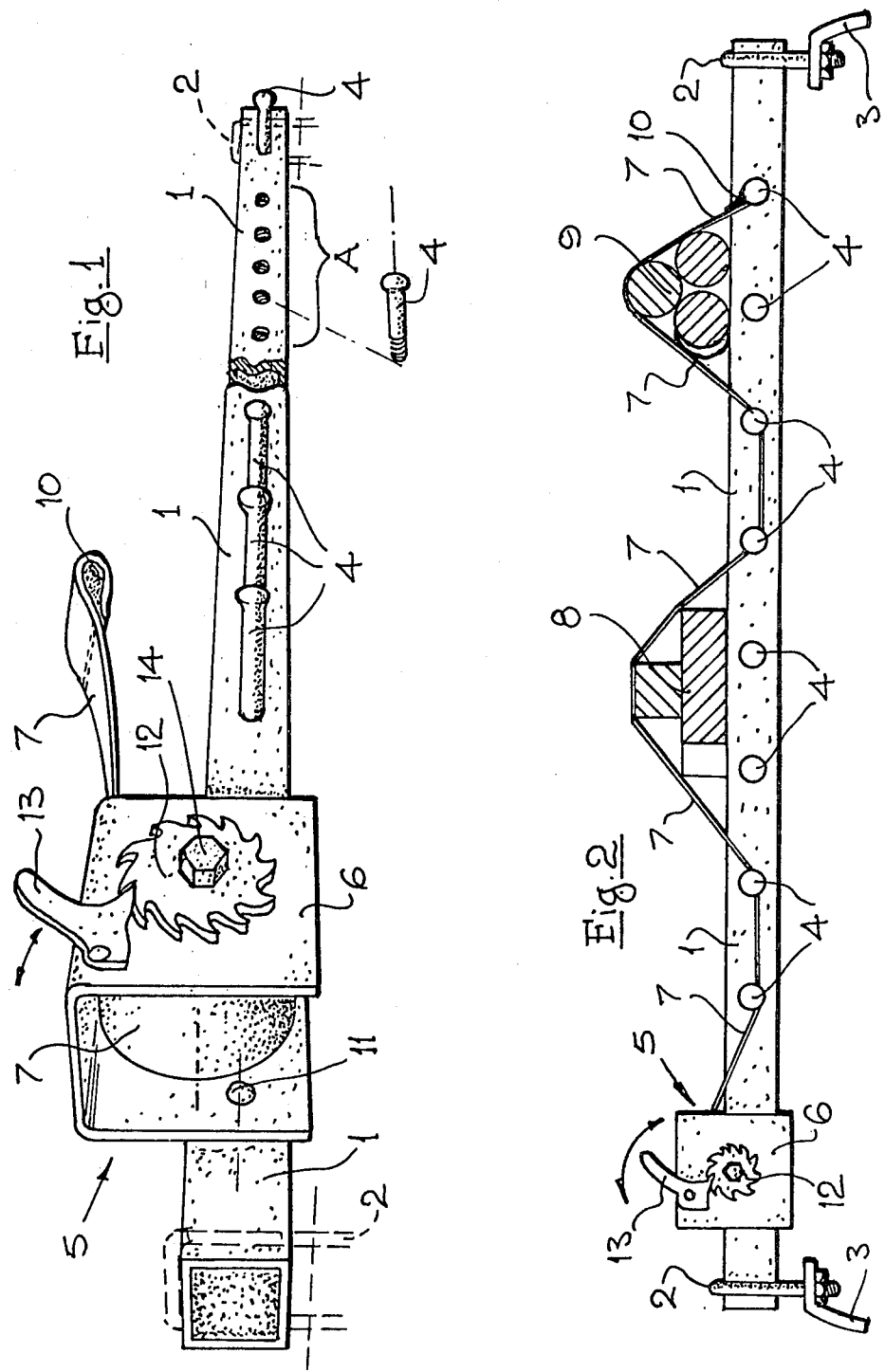

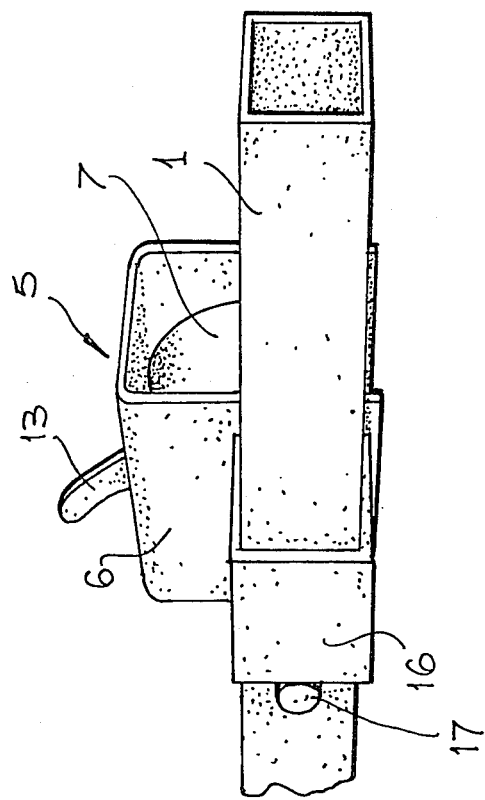
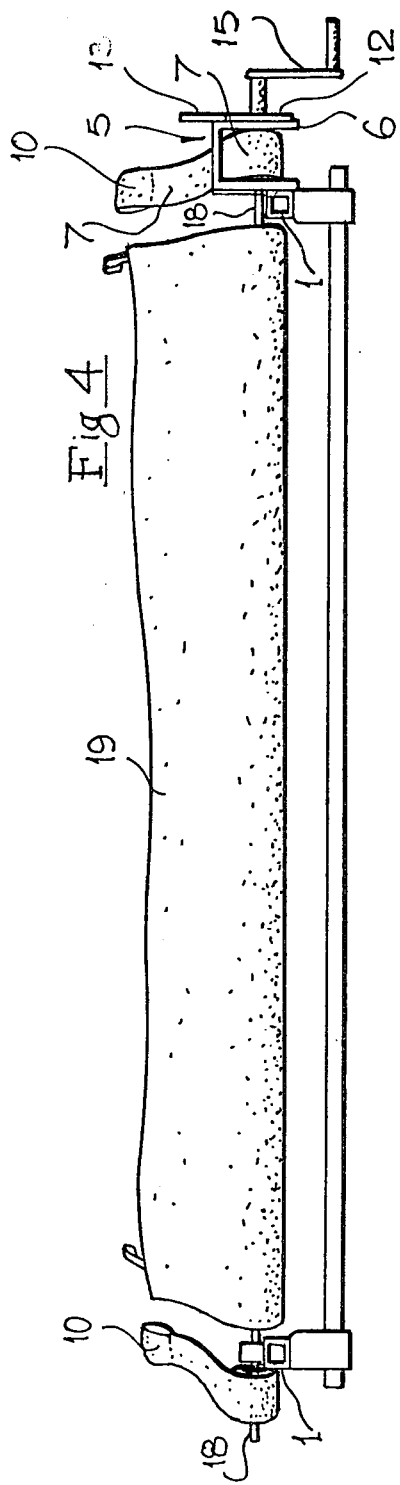

LOAD CARRYING SYSTEM

This invention relates to vehicle roof racks and more particularly to a load carrying system which enables loads to be carried on, for example, the roof of a vehicle with greater security than is presently known.

At the present time, loads are usually secured to roof racks of vehicles by means of ropes, straps, nets and the like. For comparatively small and light loads, the so-called 'octopus fastener' is sometimes utilized; this consists in a number of elasticated cables or ropes fastened together at one end of each cable, the free ends being furnished with hooks designed to engage with the bars of a conventional roof rack. All these prior art arrangements tend to be unsatisfactory in that they easily become unfastened and/or stretch so that the load may fall from the roof or at least become too loosely secured for safety.

These and other disadvantages are overcome, according to the present invention, which thus provides a load carrying system for a motor vehicle, said system comprising; at least one support element securable to said vehicle, the or each said support element being provided with a plurality of horizontally projecting belt-engaging pegs; reel means mounted adjacent one end of the or each said support element and having a rotatable spindle to which is attached one end of a load-securing belt, said belt being retractable around said spindle and extendable to beyond the other end of said support element and being provided with peg-engaging means on the end thereof remote from said spindle; the arrangement being such that a load to be carried is placed upon said support element, said belt pulled out from said reel means, passed beneath an adjacent belt-engaging peg, passed over said load, passed beneath a next adjacent peg, its end loop placed around a next adjacent peg and said spindle rotated until said belt is taut, whereby said load is securely held upon said support element.

Generally, two such support elements and their associated reel means will be employed, one at each end of a vehicle's roof and, ideally, the or each reel means is removably mounted on its associated support element for limited sliding movement therealong. Additionally, the support elements and associated reel means may be slidable along outer fore-and-aft oriented bars of a conventional vehicle roof rack. The spacing between adjacent horizontally projecting belt-engaging pegs may be adjustable.

In a modification, the or each rotatable spindle may extend beyond the housing of the reel means and may have two spaced-apart load-securing belts attached to it; advantageously, a weatherproof load-covering sheet is attached to the extended rotatable spindle intermediate the two belts.

In order that the reader may gain a better understanding of the present invention, hereinafter will be described certain embodiments thereof, by way of example only and with reference to the accompanying drawings in which:

FIG. 1 is a perspective view, partly fragmented, of a load carrying system according to the present invention;

FIG. 2 is an elevation showing how a load or loads may be securely held by the system of FIG. 1;

FIG. 3 is a perspective view showing a modified mounting for a reel means; and

FIG. 4 is a further embodiment showing the extended spindle and weatherproof cover.

In FIG. 1 is to be seen a load carrying system according to the present invention which comprises a support element 1 which is securable to a motor vehicle, generally to a roof of a said motor vehicle. Support element 1 may be, as shown, a square-section tubular extrusion of, say 1½" side but equally well could be a tube, rod or bar of any cross-section, and of any suitable material such as aluminum, aluminum alloy, steel or the like. Support element 1 is securable to the said motor vehicle by means of U-bolts affixed to conventional gutter-bracket clamps 3, best to be seen in FIG. 2. Such clamps and U-bolts are often used to mount laterally-disposed metal rods or tubes to the roof of a motor vehicle for transporting thereon of such articles as surf-boards, skis and fishing rods or poles. It will be understood that, generally, two such support elements 1 will be employed together, one secured towards the front end of a motor vehicle roof and another towards the rear end thereof.

Each support element 1 is provided with a plurality of horizontally projecting pegs 4. These pegs 4 may well be of ⅜" diameter metal rod, each about 2¾" in length and having an enlarged head end. Pegs 4 are evenly spaced along the length of support element 1. However, it may be of advantage to be able to vary the spacing between adjacent pegs and to this end the pegs may be securable into more closely spaced threaded holes in support element 1. This modification is shown, in FIG. 1, in the portion referenced A. As will be seen hereinafter, this modification is useful in the securing of loads of greatly differing cross-sectional dimensions.

Mounted close to one end of support element 1 there is provided reel means, generally denoted 5. This reel means 5 comprises a housing 6, which may be fabricated from galvanised iron, in which is a rotatable spindle, which does not need to be shown in the drawing, having attached to it one end of a load-securing belt 7. Belt 7 may well be a webbing belt of the kind used in motor vehicle seat-belt devices. Belt 7 is retractable around the spindle and is extendable by 'pulling it out' to beyond the other end of support element 1.

FIG. 2 shows how belt 7 is used to secure a load on the load support elements as exemplified by 1. Rectangular baulks of timber 8 and poles 9, for example, are placed on the support elements, as 1; belt 7 is pulled off reel means 5, passed beneath an adjacent peg 4, passed over a load to be carried such as timber baulks 8, passed beneath a next adjacent peg or pegs, passed over a further load to be carried such as poles 9 and then an end loop 10 of belt 7 placed around a next adjacent peg 4. Belt 7 may now be tautened to securely hold the loads, such as 8, 9, upon the support elements 1.

In FIG. 1 the reel means housing 6 is secured to support element 1 by such means as bolts or rivets, as 11; however it can be made to be removable by using, instead, a bolt and wing-nut. The means by which belt 7 may be tautened over a load may well comprise a ratchet-wheel 12 on the end of the spindle and outside the housing 6. Co-acting with ratchet-wheel 12 is a manually operated pawl 13. Ratchet-wheel 12, on its spindle, is rotatable by using a spanner or the like to turn the hexagon nut 14. Thus the spindle and its belt 7 is rendered, to some extent at least, tamper-proof but instead of this arrangement a cranked handle 15 may be substituted, as can be seen in FIG. 4.

As has been described, use of a bolt and wing-nut to affix reel housing 6 to support element 1 permits reel means 5, with belt 7 retracted, to be removed and stowed within the vehicle. However, perhaps a more elegant arrangement to accomplish this end is illustrated in FIG. 3. Here, housing 6 of reel means 5 is provided with a sleeve 16 which is slidable along support element 1, inwardly from the end thereof. When a load is to be secured to the support element, the reel means 5 is slipped over support element 1 and the belt 7 tautened over the load. The sleeve 16 of housing 6 is prevented from sliding too far along support element 1 by the stop 17 provided on the support element 1.

In an embodiment of the present invention as shown in FIG. 4, a reel means 5 has a long spindle 18 which extends far beyond housing 6, for example, from the front to the rear of a vehicle roof. Long spindle 18 will be journalled in some suitable way at its end remote from the reel means end, and have a belt 10 at each end. Between belts 10 and retractable and extendable with them is a weatherproof cover 19 which may be a tarpaulin or the like and is extendable to cover a load carried by the load carrying system; the free edge of cover 19 may be conventionally secured by such means as hooks. Weatherproof cover 19 may be arranged to be removable from extended spindle 18 when not required to cover a load.

Since loads to be carried on the roof of a vehicle vary considerable in length, it is advantageous to arrange for the two support elements and associated reel means to be movable towards and away from each other to accommodate these varying lengths. When, as illustrated in FIGS. 1 and 2, the support elements 1 are attached to conventional gutter brackets 3, changes in the lengths of goods to be carried may be accommodated simply be moving one pair or both pairs of brackets along the roof gutter of the vehicle roof. However, many owners of motor vehicles have a 'basket' type of roof racks more or less permanently attached to the vehicle roof. In such cases, support elements 1 can be attached to the outer, upper fore-and-aft oriented bars of the 'basket' just as easily. This kind of attachment may be a quick-release device of known type so that the support elements and reel means can be easily moved along the bars to thus accommodate loads of various lengths.

It will be appreciated that while the reel spindles have been described as being capable of being rotated by means of a hexagon nut 14 and a spanner or by a handle 15, the reels could as well be operated by such means as an electric motor or by compressed air. Non-manual rotation would be particularly applicable in the securing of heavy loads on large vehicles.

From the foregoing it will be realized that a load carrying system according to the present invention offers several advantages over what is already known, viz:

(a) Luggage or goods are held more securely as compared with tying down with cord or rope;

(b) as belts have a much broader bearing area than has cord or rope; less likelihood of damage to luggage or goods exists;

(c) less time is required to secure goods to the vehicle;

(d) luggage or goods of uneven shapes and sizes can be safely carried together due to the arrangement of belt-engaging pegs;

(e) the support elements and associated reel means can be fitted to existing roof racks or in any suitable position on a vehicle;

(f) the reel means may be removed from the support elements, in a most preferred embodiment, for stowage elsewhere when not required to be used;

(g) the support elements may be of any length and have any number of pegs, and the belt may be of any suitable length, to thus suit any width of vehicle;

(h) with equal facility the device may be adapted for use with sedans, station wagons, utilities, boat and other trailers, table-top trucks and the like.

From the above description taken in conjunction with the accompanying drawings it will be readily appreciated that load carrying systems constructed according to the present invention offer to the public a much improved way of securing loads to vehicles or, at the very least, provide an attractive and useful alternative.

I claim:

1. A motor vehicle having a roof, a load-carrying system on said roof, said system comprising:

a pair of support elements securable transversely across said roof adjacent forward and rearward ends thereof respectively;

at least three spaced-apart belt-engaging pegs projecting horizontally from a side of each said support element;

reel means mounted at one end of each said support element, on the said side thereof, and each having a rotatable spindle to which is attached one end of a load-securing belt, said belt being retractable about said spindle and extendable to beyond the other end of said support element and having a peg-engaging loop on the end thereof remote from said spindle;

said belt and pegs being positioned so that a load carried upon said support elements and above said roof can be secured by each belt being pulled out from its associated reel means, passed beneath an adjacent belt-engaging peg, passed over said load, passed beneath a next-adjacent peg, its peg-engaging loop placed about a next-adjacent peg and said spindle rotated until said belt is taut;

a spindle-locking mechanism on each said reel means to maintain tension on each said belt.

2. A motor vehicle as claimed in claim 1, wherein each said reel means is mounted upon its associated support element for limited sliding movement therealong.

3. A motor vehicle as claimed in claim 1, wherein said support elements and reel means mounted thereon are slidable along the fore-and-aft oriented bars of a coventional automobile roof rack.

4. A motor vehicle as claimed in claim 1, wherein said belt-engaging pegs are adjustable in position on said support elements so as to vary the spacing therebetween.

5. A motor vehicle as claimed in claim 1, wherein said spindle-locking mechanisms each include a rachet wheel rigidly mounted on one end of said spindle and a co-acting pawl pivotally mounted on said reel means.

6. A motor vehicle as claimed in claim 1, wherein a weatherproof load-covering sheet is attached to each said extended spindle intermediate said two spaced-apart load-securing belts.

7. A motor vehicle having a roof, a load carrying system on said roof, said system comprising:

a pair of support elements transversely secured so as to be slidable along fore-and-aft oriented bars of a conventional automobile roof rack;

at least three spaced-apart belt-engaging pegs projecting horizontally from a side of each said support element;

reel means mounted upon the said side of each support element for limited sliding movement therealong;

each said reel means having a rotatable spindle to which is attached one end of a load-securing belt, said belt being retractable about said spindle and extendable to beyond the other end of said support element and being provided with a peg-engaging loop on the end thereof remote from said spindle;

a load to be carried being placed upon said support elements, each belt being pulled out from its reel means, passed beneath an adjacent belt-engaging peg, passed over the load to be carried, passed beneath a next-adjacent peg, its peg-engaging loop placed about a next-adjacent peg and said spindle rotated until said belt is taut;

a spindle-locking mechanism on each said reel means acting to maintain tension on the associated belt, said spindle-locking mechanism including a ratchet wheel rigidly mounted on one end of the spindle and a co-acting pawl pivotally mounted on the said reel means;

each said belt-engaging peg being adjustable with respect to its support element so as to enable the spacing between adjacent pegs to be varied.

8. A load carrying system for a motor vehicle, said system comprising:

a pair of support elements securable to a superstructure of said vehicle adjacent forward and rearward ends thereof respectively;

at least three spaced-apart belt-engaging pegs projecting horizontally from a side of each said support element;

reel means mounted on at least one end of at least one said support element, on the said side thereof, and the reel means having a rotatable spindle which extends beyond a housing of its associated reel means and to which is attached one end of each of a pair of spaced-apart load-securing belts, each said belt being retractable about said spindle and extendable to beyond the other end of said support element, and having a peg-engaging loop on the end thereof remote from said spindle;

said belts and pegs being positioned so that a load carried upon said support elements can be secured by each belt being pulled out from its associated reel means, passed beneath an adjacent belt-engaging peg, passed over said load, passed beneath a next-adjacent peg, its peg-engaging loop placed about a next-adjacent peg, and said spindle rotated until said belt is taut; and a spindle-locking mechanism on each reel means to maintain tension on each said belt.

* * * * *